(12) United States Patent
Augustsson

(10) Patent No.: US 6,571,031 B1
(45) Date of Patent: May 27, 2003

(54) DEVICE FOR MULTIPLEXING/DEMULTIPLEXING AND METHOD THEREWITH

(75) Inventor: Torsten Augustsson, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 236 days.

(21) Appl. No.: 09/703,788

(22) Filed: Nov. 2, 2000

(30) Foreign Application Priority Data

Nov. 5, 1999 (SE) .............................................. 9904023
Jul. 24, 2000 (SE) .............................................. 0002750

(51) Int. Cl.⁷ .............................................. G02B 6/28
(52) U.S. Cl. .............................. 385/24; 385/37; 385/47
(58) Field of Search .................................. 385/1–10, 24, 385/31, 37, 38, 47, 48; 359/115–117, 124–134

(56) References Cited

U.S. PATENT DOCUMENTS

| 5,953,467 A | * | 9/1999 | Madsen | 372/20 |
| 6,222,958 B1 | * | 4/2001 | Paiam | 356/491 |
| 6,345,136 B1 | * | 2/2002 | Augustsson | 385/10 |
| 2002/0006249 A1 | * | 1/2002 | Augustsson | 385/24 |

FOREIGN PATENT DOCUMENTS

| EP | 0814629 | 6/1997 |
| WO | WO9839686 | 9/1998 |

OTHER PUBLICATIONS

Augustsson, T., "Bragg Grating Assisted MMIMI Coupler for Wavelength Selective Switching", Electronics Letters, Dec. 10, 1998, vol. 34, No. 25, pp. 2416–2417.*

Augustsson, T., "Bragg Grating–Assisted MMI–Coupler for Add–Drop Multiplexing", Journal of Lightwave Technology, Aug. 1998, vol. 16, No. 8, pp. 1517–1522.*

Soldano, L.B. eta 1.. "Optical Multi–Mode Interference Devices Based on Self–Imaging: Principles and Applications" Journal of Lightwave Technology, vol. 13, Nr 4, Apr. 1995, pp. 615–627.

(List continued on next page.)

Primary Examiner—Akm E. Ullah
Assistant Examiner—Michelle R. Connelly-Cushwa
(74) Attorney, Agent, or Firm—Burns, Doane, Swecker & Mathis, L.L.P.

(57) ABSTRACT

A device for multiplexing a wavelength multiplexed optical signal (25) comprising at least a first and a second optical wavelength channel centered around respective predetermined wavelengths ($\lambda_1$, $\lambda_2$), comprising an MMI coupler (2), at least of the size 2×2, for inputting the wavelength multiplexed optical signal at an input (3) and for splitting the multiplexed signal into components and imaging these at several ports (13–21), Michelson waveguides (27–31) for receiving and transporting the components imaged at the port of the MMI coupler, reflecting means (33–41) for reflecting the components received and transported in the Michelson waveguides back to the ports of the MMI coupler, wherein the MMI coupler is arranged for inputting the reflecting components, and the respective lengths of the Michelson waveguides are adapted so that said MMI coupler combines the components in a manner such that the first and the second optical wavelength channels are imaged substantially at separated outputs (5–11).

17 Claims, 3 Drawing Sheets

OTHER PUBLICATIONS

Jean–Pierre Weber et al., "*A New Type of Tunable Demultiplexer Using a Multi–leg Mach–Zehnder Interferometer*," Ericsson Components AB, Fiber Optics Research Center, Stockholm, Sweden, pp. 1–4.

H. Venghaus et al., "*Optical Add/Drop Multiplexers for WDM Communication Systems*," OFC '97 Technical Digest, pp. 280–281.

G.P. Agrawal et al., "*Phase–Shifted Fiber Bragg Gratings and Their Application for Wavelength Demultiplexing*," IEEE Photonics Technology Letters, vol. 6, No. 8, Aug. 1994, pp. 995–997.

C.K. Madsen, "*A Multiport Frequency Band Selector with Inherently Low Loss, Flat Passbands, and Low Crosstalk*," IEEE Photonics Technology Letters, vol. 10, No. 12, Dec. 1998, pp. 1766–1768.

* cited by examiner

Våglängd (nm)

DEVICE FOR MULTIPLEXING/ DEMULTIPLEXING AND METHOD THEREWITH

This application claims priority under 35 U.S.C. §§119 and/or 365 to 9904023-0 and 0002750-8 filed in Sweden on Nov. 5, 1999 and Jul. 24, 2000, respectively; the entire content of which is hereby incorporated by reference.

TECHNICAL FIELD

The present invention relates to optical transmission techniques, particularly single mode integrated optics, for tele and data communication. Specifically, the invention relates to a device for wavelength selective multiplexing/ demultiplexing and a method therewith.

BACKGROUND OF THE INVENTION AND RELATED ART

A number of different methods to increase the capacity of optical fibres in a network are known. One of these comprises to utilize wavelength division multiplexing (WDM) in order to improve the utility of bandwidth in the network, which, however, requires provision of devices capable to multiplex and demultiplex transmission channels that are transferred at different, so-called optical carrier wavelengths, in the network.

The publication A new type of tunable demultiplexer using a multileg Mach-Zehnder interferometer, J. -P. Weber et al, Proc. ECIO '97 EthE5, Stockholm, pages 272–275, 1997, shows an MMIMZI device 1 (multimode interference Mach-Zehnder interferometer) that may be used for cyclic wavelength selective switching.

C. K. Madsen, A multiport frequency band selector with inherently low loss, flat pass bands, and low cross-talk, Photon. Tech. Lett., Vol. 10(12), pages 1766–1768, 1998.

WO 98/39686 and T. Augustsson, Bragg grating assisted MMIMI coupler for wavelength selective switching, Electron. Lett., Vol. 34(25), pages 2416–2418, 1998 describes an MMIMIBg device (Bragg grating assisted multimode interference Michelson interferometer), which offers an entirely individual switching.

Generally, the problems of the above known techniques comprise a long propagation path for the light through the respective device, which gives rise to large losses and instabilities. Further, to tune (phase control) the device relatively high energy consumption is needed. Further, known techniques may give problems with channel crosstalk and need relatively complicated structures.

SUMMARY OF THE INVENTION

It is an object of the present invention to provide a device for demultiplexing a wavelength multiplexed optical signal comprising at least a first and a second optical wavelength channel, which exhibits improved performance.

It is in this respect a particular object of the invention to provide such a device that exhibits better filter profiles and a lower channel crosstalk.

It is a further object of the invention to provide a device for demultiplexing, which is more compact than multiplexers known in the art.

Further objects of the invention will be apparent from the description below.

According to a first aspect of the present invention a device is provided comprising:

(1) an MMI coupler, at least of the size 2×2, for receiving a wavelength multiplexed optical signal comprising at least two wavelength channels at an input and for splitting the multiplexed signal into components and imaging these at several of its ports,
(2) Michelson waveguides for receiving and transporting the components imaged at the ports of the MMI coupler, and
(3) reflecting means for reflecting the components received and transported in the Michelson waveguides back towards the ports of the MMI coupler.

The MMI coupler is further arranged for receiving the reflected components and the respective lengths of the Michelson waveguides are adapted to enable said MMI coupler to combine the components so that the first and the second optical wavelength channels are imaged substantially at different outputs of the MMI coupler.

Preferably, the Michelson waveguide lengths are different and the differences of the lengths between them are determined in dependence on the wavelength channel distance.

The device can further comprise one or several phase adjustment means for phase adjustment of the components received and transported in the Michelson waveguides. These phase adjustment elements may comprise trimming elements for permanent fine adjustment of the phase or of phase control elements for active phase control of the phase.

Further, the device is reciprocal in that it works in an equivalent manner for multiplexing in the back direction.

According to a second aspect of the present invention there is thus provided a device for multiplexing at least a first and a second optical wavelength channel comprising:

(1) an MMI coupler, at least of the size 2×2, for receiving the first and the second optical wavelength channel at a respective input and for splitting said channels into components and imaging these at several of its ports,
(2) Michelson waveguides for receiving and transporting the components imaged at the ports of the MMI coupler, and
(3) reflecting means for reflecting the components received and transported in the Michelson waveguides back towards the ports of the MMI coupler.

The MMI coupler is further arranged for receiving the reflected components and the respective lengths of the Michelson waveguides are adjusted so that said MMI coupler combines the components in such a manner that a wavelength multiplexed optical signal comprising said first and said second optical wavelength channel is imaged substantially at a single output of the MMI coupler.

According to a third aspect of the present invention there is provided a device for optical add/drop multiplexing comprising a device of the above kind for demultiplexing and a device of the above kind for multiplexing.

Preferably, the add/drop multiplexing device comprises an input waveguide for inputting an optical multiplexed signal to the demultiplexer, at least one transit waveguide for outputting a demultiplexed channel from the demultiplexer and for transmission, and inputting the same at the multiplexer, at least one waveguide for outputting a further demultiplexed channel from the demultiplexer for dropping (dropping functionality), at least one waveguide for inputting a further channel to the multiplexer (add functionality), and an output waveguide for outputting an optical multiplexed signal comprising the demultiplexed channel transmitted in the transit waveguide and the further signal input to the multiplexer.

In one embodiment of the present invention the demultiplexer and multiplexer of the add/drop multiplexing device have active phase control elements, whereby the device exhibits wavelength selective tunability.

It is a further object of the invention to provide at least one method for demultiplexing a wavelength multiplexed optical signal.

According to a fourth aspect of the present invention there is provided a method for demultiplexing comprising the steps of:
(1) inputting the wavelength multiplexed optical signal at an input of an MMI coupler, at least of the size 2×2, and splitting the signal into components, which are imaged at several ports of the MMI coupler,
(2) inputting and transporting the components imaged at the ports of the MMI coupler in the Michelson waveguides,
(3) reflecting the components input and transported in the Michelson waveguides back towards the ports of the MMI coupler at adapted distances from the MMI coupler, and
(4) inputting and combining the reflected components in the MMI coupler, whereby the first and the second optical wavelength channels are imaged substantially at different outputs.

The advantages of the present invention are principally that the device is compact and thereby admits a short propagation path for the light. Thus, lower losses and stability against temperature gradients are achieved. Further, the invention shows a flexible functionality, provides possibilities for creating improved performance and that it in some respects exhibits more system tolerant properties in comparison with known art, which uses linear phase responses.

SHORT DESCRIPTION OF THE DRAWINGS

The invention will be described closer below with reference to the appended drawings, which are only shown to illustrate the invention and shall, therefore, in no way limit the same.

PREFERRED EMBODIMENTS

Figure 1:
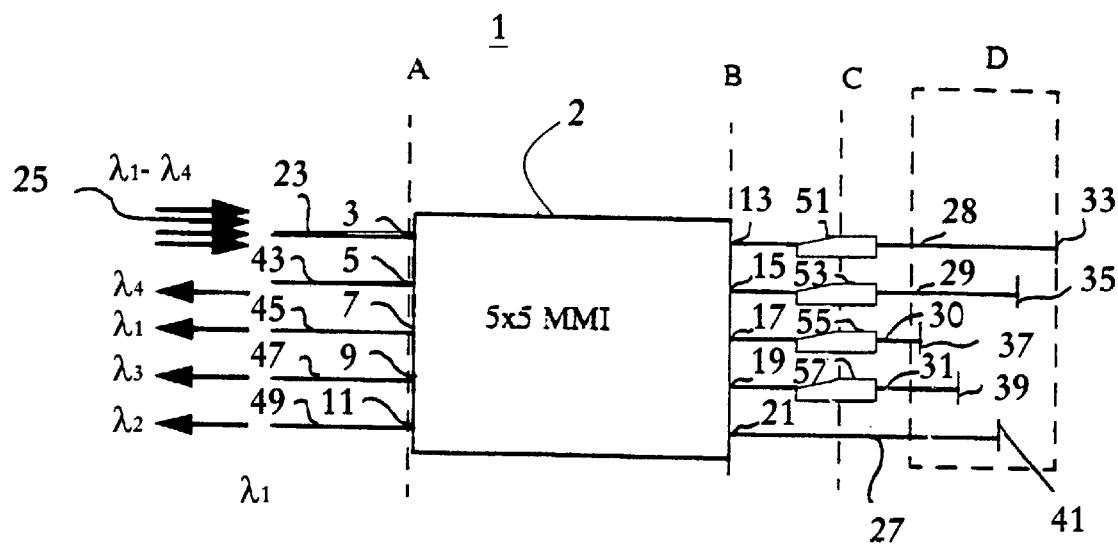
FIG. 1 illustrates, schematically, a device for demultiplexing a wavelength multiplexed optical signal according to one embodiment of the present invention.

In the following description, with a describing and not limiting purpose, specific details are given, such as particular applications, techniques, methods etc., to provide a thorough understanding of the present invention. It shall, however, be apparent for the man skilled in the art that the invention may be practised in other embodiments that deviate from these specific details. In other instances, detailed descriptions of well-known methods, devices or circuits are omitted so as not to obscure the present description with unnecessary details.

The present invention comprises a new and inventive device for multiplexing/demultiplexing an optical signal comprising an MMI coupler both for splitting the optical signal (in one direction) and for phase dependent combining (in the second direction), i.e. in a Michelson configuration. The reflecting structure, which may be comprised of a Bragg grating, is adapted to achieve a phase relation between the different splitted components for each desired wavelength, which enables combining the different components while obtaining a desired multiplexing/demultiplexing functionality.

The wavelength selective device may comprise i.a. the following basic components:

Michelson waveguides or Michelson arms are used to realize an interference component for e.g. filters, couplers and modulators.

An MMI waveguide structure (MMI, multimode-interference) is used for splitting light. A theory for this may be found e.g. in L. B. Soldano and E. C. M. Pennings, Optical Multi-Mode Interference Devices Based on Self-Imaging: Principles and Application, J. Lightwave Technol., Vol. 13(4), pages 615–627, 1995, and in the references therein.

MMI splitting of light gives a multiple imaging of the incoming intensity distribution. The length/width ratio of the MMI structure controls the number of images at its outputs, which mutually have a certain determined phase relation, which depends on at which input the light is excited.

A Bragg grating is used for filtering and reflection of light. The filter profile may be modulated by the strength, length and variable period (grating wavelength), i.e. so-called chirp, of the grating. The strength and the period can be varied in the direction of the propagation of light. Such a variation of the strength is called apodization. In the present invention the type of Bragg grating is utilized that reflects a wide spectral band (many wavelength channels). Such a grating may be obtained by using a very strong grating or a chirped grating or a combination thereof. By using a chirped grating and possibly vary the strength of the grating, a non-linear phase response for the reflected light may be realized to obtain a more system tolerant filter profile.

A more comprehensive description of Bragg gratings for wavelength demultiplexing may be found i.a. in G. P. Agrawal and S. Radic, Phase-shifted Fiber Gitters and their Application for Wavelength Demultiplexing, IEEE Photon. Tech. Lett., Vol. 6(8), pages 995–997, August 1994.

A phase adjustment element (phase control element or trimming element) may be needed to provide coupling possibilities and to correct for imperfections during fabrication of the inventive device. A basic aspect of a phase control element is that the optical path length is effected by an externally applied signal (voltage, current, etc.). For this purpose, the best way to effect (control) the phase is to use a thermo-optical element, i.e. effect the refractive index (and thus the optical path length) in the waveguides by the temperature. Some waveguides may also be effected in a similar manner by applying an electrical field over the waveguide, i.e. the refractive index is effected electro-optically. If only adjustment is needed a UV-trimming can be performed (permanent adjustment), at least as regards the material system $SiO_2/Si$.

With reference now to FIG. 1, which schematically illustrates a device 1, also called MMIMI demultiplexer (MMIMI, multilode interference Michelson interferometer), for demultiplexing a wavelength multiplexed optical signal, a first embodiment of the present invention will be described. The device comprises a 5×5 MMI structure 2, which has five ports 3, 5, 7, 9, 11 at a first side or interface A and five ports 13, 15, 17, 19, 21 at a second oppositely located side or interface B. The port 3 is an input port for inputting a transmitted wavelength multiplexed optical signal 25 in a waveguide 23, called an access waveguide, said signal comprising four wavelength channels centered around the respective wavelengths $\lambda_1$, $\lambda_2$, $\lambda_3$ and $\lambda_4$.

The MMI coupler 2 has a length/width ratio so that a suitable number of images (five in the present embodiment) of incoming light distribution is achieved at the interface B. An approximative equation that describes this ratio for an N×N MMI coupler is:

$$L \approx (M/N)(4nW^2/\lambda),$$

where L is the length of the MMI waveguide, W its effective width, $\lambda$ is the wavelength of the light (the center wavelength for the wavelength multiplex), n is the so-called effective index of the MMI waveguide (index for the MMI waveguide if a transformation from a 3- to a 2-dimensional consideration is made), N is the number of images and M is an integer (normally M=1 is chosen). For further details in this respect reference is made to the above article by Soldano and Pennings.

Figure 2:
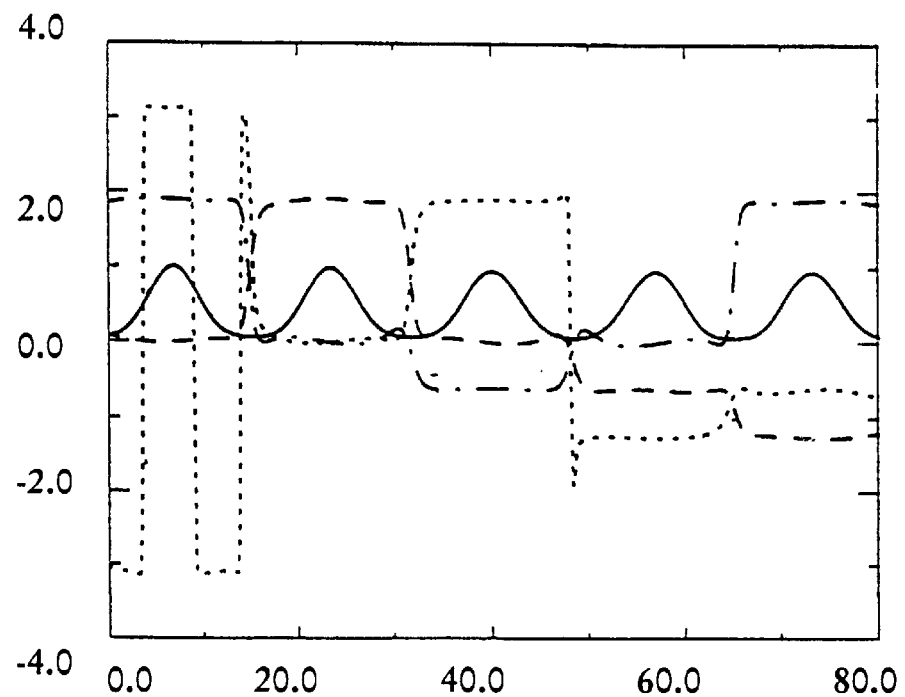
FIG. 2 illustrates, schematically, an example of intensity distribution and phase relation for different signal components in the device in FIG. 1.

In the present embodiment the MMI coupler 2 is designed so that five images of the incoming signal 25 are created at the respective ports 13, 15, 17, 19, 21. In FIG. 2 is shown normalized intensity distribution in arbitrary units (unbroken line) and phase distribution in radians (dashed line, short dashes), respectively, as a function of the MMI waveguide position in $\mu$m along the interface B for the splitted signal 25.

At each such port a respective Michelson waveguide or Michelson arm 27, 28, 29, 30, 31 is arranged for further propagation of the respective signal image or signal component. Each Michelson waveguide 27, 28, 29, 30, 31 ends in a respective reflecting means 33, 35, 37, 39, 41, which together comprise a reflecting structure D. The reflecting means 33, 35, 37, 39, 41 may be comprised of total reflection structures, but are preferably comprised of reflecting Bragg gratings.

Thus, the signal components are reflected by the reflecting means and propagate back in the Michelson waveguides towards the ports 13, 15, 17, 19, 21. The lengths of the Michelson arms determine the phase relation between the different signal components at the respective port for each given wavelength channel. This phase relation determines in turn how the imaging, provided by the MMI coupler in the back direction, appears at the interface A.

According to the invention the lengths of the Michelson arms 27, 28, 29, 30, 31 are designed, i.e. individually adapted, so that the phase relation between the signal components obtained at the interface B for the respective wavelength channel (at the wavelengths $\lambda_1$, $\lambda_2$, $\lambda_3$ and $\lambda_4$) is such that the channels are combined in the MMI coupler 2 and, further, are focused towards different ports. Preferably, the Michelson structure is designed so that the wavelength channel at $\lambda_4$ is imaged at port 5, the channel at $\lambda_1$ is imaged at port 7, the channel at $\lambda_3$ is imaged at port 9 and the channel at $\lambda_2$ is imaged at port 11. These ports 5, 7, 9, 11 are further arranged for outputting the wavelength channels at the respective output waveguide 43, 45, 47, 49. It is the channel distance which determines the necessary length differences between the MI arms.

FIG. 2 illustrates schematically an example of phase (in radians) as a function of MMI waveguide position (in $\mu$m) along the interface B for the signal components for the wavelength channels at $\lambda_4$ (dashed line, long dashes) and $\lambda_1$ (dash dotted line), which give focus at the ports 5 and 7.

Since the MMI coupler is symmetrical and reciprocal, the phase relations for the signal components for the wavelength channels at $\lambda_3$ and $\lambda_2$ at the interface B, which give focus at the ports 9 and 11, will be mirror images of the phase relations for the signal components for the wavelength channel at $\lambda_4$ and the incoming signal 25, respectively.

Using the fabrication technology of today it can be difficult to obtain acceptable tolerances of the length of the MI arms. Therefore, the MMIMI demultiplexer 1 preferably comprises phase control elements 51, 53, 55, 57 in at least four of the Michelson arms 28, 29, 30, 31. Also the fifth Michelson arm 27 may, however, comprise such an element (not shown in FIG. 1). The phase control elements 51, 53, 55, 57 can be comprised of simple trimming devices or adjustment elements for permanent fine adjustment or they can be comprised of active phase control elements, particularly electro-optical phase control elements.

In the latter instance also selective (cyclic) switching of the wavelength channels at the wavelengths $\lambda_1$, $\lambda_2$, $\lambda_3$ and $\lambda_4$, respectively, is permitted to the ports 5, 7, 9, 11.

Figure 3:
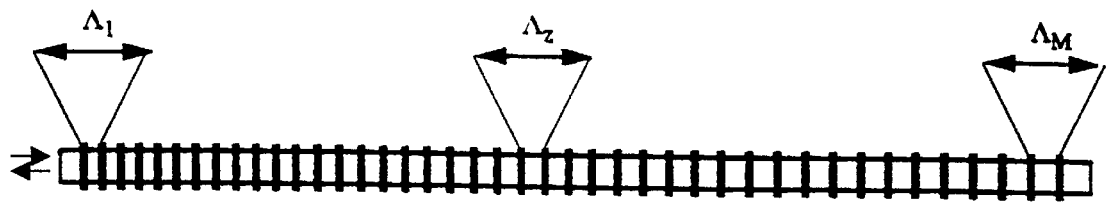
FIG. 3 illustrates, schematically, a chirped Bragg grating for use as an alternative to a reflecting means comprised in the device in FIG. 1.

Further, a chirped Bragg grating, schematically illustrated in FIG. 3, can be used as an alternative to the respective reflecting means 33, 35, 37, 39, 41 in the device in FIG. 1. This Bragg grating may give reflection with a non-linear phase response.

If the reflecting section is a chirped Bragg grating, the filter characteristic can be severely enhanced. The grating period $\Lambda$ relates to the Bragg wavelength $\lambda_{Bg}(z)$ according to ($\Lambda(z)=\Lambda_z$):

$$\lambda_{Bg}(z)=2n_e(z,\lambda)\Lambda(z),$$

where $n_e(z, \lambda)$ is the effective, refractive index depending on the distance z in the direction of propagation of light and on the wavelength of light $\lambda$. An expression for a desired $\Lambda$-distribution may be $$\Lambda(z)=\Lambda_1+c_1z+c_2z^2+c_3z^3+\ldots,$$

where $c_1$, $c_2$ and $c_3$ are constants. Said expression may be a Taylor series of an arbitrary function.

Also, the strength $K_i$ of the grating can be varied $$K_i(z)=\pi\Delta n(z)/\lambda_{Bg}(z),$$

where $\Delta n$ is the difference between high and low index level in the grating structure.

The design and fabrication of the grating structure (K- and $\lambda_{Bg}$-distribution) have to be performed individually for each MI arm in dependence on channel separation, desired filter profile and probably also bit rate (dynamic response).

If a reflection structure with a non-linear phase response is implemented, a possibility is given to severely enhance the filter profile. Achieving a non-linear phase response in MI structures ought to be simpler than in corresponding MZI structures—see the above article by C. K. Madsen for the MZI case.

If it is acceptable to output one of the demultiplexed channels at the same port as the wavelength multiplexed optical signal is input, it is possible to reduce the size of the MMI structure. In the embodiment depicted in FIG. 1 it would then be fully possible to use a 4×4 MMI coupler instead of a 5×5 MMI coupler.

Further, the MMIMI demultiplexer 1 is reciprocal and thus has an equivalent multiplexing functionality. In this respect, with reference again to FIG. 1, the four wavelength channels at $\lambda_4$, $\lambda_1$, $\lambda_3$ and $\lambda_2$, respectively, are input at ports 5, 7, 9, 11 via waveguides 43, 45, 47, 49. The MMI coupler 2 splits and images the respective channel at ports 13, 15, 17, 19, 21 at the interface B. Here, the components of the respective channel have the same mutual phase relation as the reversely directed components in the demultiplexing case (reciprocity) Thereafter the components are fed into the MI waveguides 27, 28, 29, 30, 31 for propagation towards the respective reflecting means 33, 35, 37, 39, 41 and for reflection at said reflecting means at D back towards the ports 13, 15, 17, 19, 21 at the interface B. At this interface the components of all channels have a mutual phase relation, which is the same as that of the reversely directed components of the signal 25 in the demultiplexing case (reciprocity). Thus, all channels are focused at port 3 and a multiplexed signal comprising the wavelength channels at the wavelengths $\lambda_1$, $\lambda_2$, $\lambda_3$ and $\lambda_4$, respectively, is output in the waveguide 23.

Figure 4:
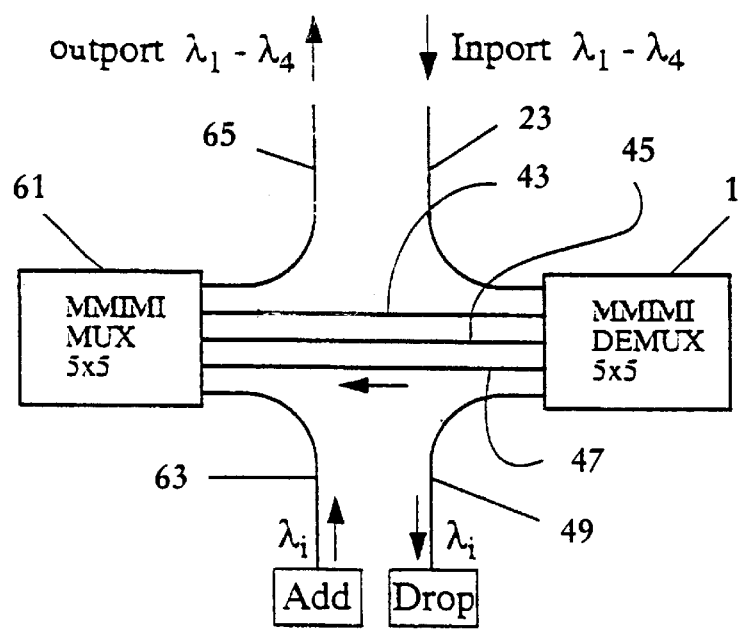
FIG. 4 illustrates, schematically, a device for optical add/drop multiplexing according to a further embodiment of the present invention.

Next, with reference to FIG. 4, an optical add/drop multiplexer (OADM) in accordance with the invention will be further described. The OADM device comprises an MMIMI demultiplexer 1 with waveguides 23, 43, 45 and 47 and further an MMIMI multiplexer 61 of the kind described above with reference to FIG. 1. The waveguide 23 is arranged for guiding a transmitted wavelength multiplexed optical signal comprising four wavelength channels at $\lambda_1$, $\lambda_2$, $\lambda_3$ and $\lambda_4$ and for inputting the same into the MMIMI demultiplexer. Said multiplexer is arranged to demultiplex the optical signal and to output the respective wavelength channel (at $\lambda_4$, $\lambda_1$, $\lambda_3$ and $\lambda_2$) in the respective waveguide 43, 45, 47, 49, of which the three first-mentioned, also called transit waveguides, are directly connected to the MMIMI multiplexer 61. The last-mentioned waveguide provides for a so-called drop functionality, i.e. the wavelength channel $\lambda_2$ propagating therein may be dropped and switched off. Further, there is arranged a waveguide 63 for inputting a wavelength channel at the same wavelength as the switched-off channel to the MMIMI multiplexer 61. This wavelength connection thus provides for so-called add multiplexing. The demultiplexed channels at the wavelengths $\lambda_1$, $\lambda_2$, $\lambda_3$ and $\lambda_4$ are thus input to the multiplexer 61, multiplexed and output in a waveguide 65 as a wavelength multiplexed signal.

By providing the demultiplexer 1 and the multiplexer 61 with active phase control elements in the respective MI structures a wavelength selectively tunable OADM device is achieved, where, by controlling the phase control elements, any channel $\lambda_i$ may be directed to the waveguide 49 and/or input the same channel in the access waveguide 63.

Figure 5:
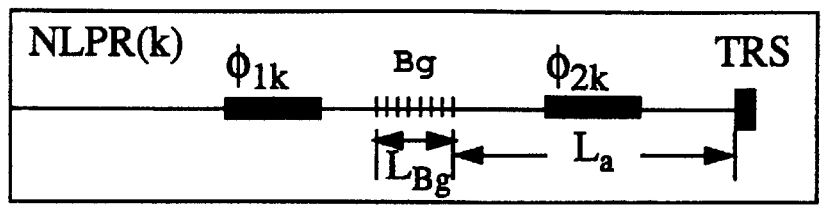
FIG. 5 illustrates, schematically, an NLPR device (NLPR, Non-Linear Phase response Reflection) for use as an alternative to a reflecting means as comprised in the device of FIG. 1.

Further, an NLPR device (NLPR, Non-Linear Phase response Reflection), schematically shown in FIG. 5, may be used as an alternative to the respective reflecting means 33, 35, 37, 39, 41 in the device of FIG. 1.

This NLPR device, in FIG. 5 denoted NLPR(k), which like the device of FIG. 3 achieves reflection with non-linear phase response, is based on a Fabry-Perot cavity and comprises a partially reflecting Bragg grating Bg(k) and a total reflecting structure TRS.

Further, a phase adjustment element $\phi_{2k}$ may be comprised in the cavity and a further phase adjustment element $\phi_{1k}$ may be arranged at the end of the NLPR device which is coupled to the respective Michelson waveguide 27, 28, 29, 30, 31.

The phase adjustment elements are preferably trimming elements for permanent adjustment of the phase of the respective component(s), which propagate through them, but they may alternatively be comprised of phase control elements, particularly thermo-optical control elements.

In order to realize a (de)multiplexer according to FIG. 1 the reflecting means 33, 35, 37, 39 and 41 are accordingly exchanged to NLPR devices denoted NLPR(2), NLPR(1), NLPR(-2), NLPR(0) and NLPR(-1). In such a version the different Michelson arms are in the demultiplexer of FIG. 1 preferably arranged such that the arm 30 is the shortest, arm 27 the second shortest, arm 31 the third shortest, arm 29 the second longest and arm 28 the longest, and the output (demultiplexing) may be arranged such that the channel $\lambda_4$ is output (imaged) at port 7, the channel $\lambda_2$ is output at port 11, the channel $\lambda_3$ is output at port 9 and the channel $\lambda_4$ is output at port 5.

The lengths $L_k$ of the various Michelson waveguides (k is the same index as for the above-mentioned NLPR devices) are obtained through $$L_k = L_0 + kw/2N$$

where $L_0$ is a given, arbitrarily chosen length of Michelson waveguide k=0, N is the number of Michelson waveguides in the demultiplexer and $w=\lambda^2/\Delta\lambda \cdot n_g$), in which expression $\lambda$ is the center wavelength for the incoming wavelength multiplex, $\Delta\lambda$ is the wavelength distance between two adjacent channels and $n_g$ is the group refractive index of the waveguides.

The strength, or the reflectivity, of the Bragg gratings in the different NLPR devices is different (cf. the indexes k for the device and the Bragg grating, respectively, in FIG. 5). The reflectivity is given by:

$$r_k = k/(2N-k) \text{ for } k>0 \text{ and}$$

$$r_k = k/(k-2N) \text{ for } k<0.$$

For k=0 a reflectivity of zero is obtained. Thus, the non-linear NLPR(0) is degenerating into a linear TRS, i.e. no Bragg grating at all is required.

The reflectivity is related to the grating strength K (kappa) in such a way that the following expression is approximately valid at the Bragg wavelength:

$$|r| = kL_{Bg} \text{ for } kL_{Bg} \ll 1$$

where $L_{Bg}$ is the length of the Bragg grating.

Further, the phase adjustment elements $\phi_{1k}$ and $\phi_{2k}$ are differently adjusted or set in the various NLPR devices. Thus positive indexes mean that the corresponding device (Fabry-Perot cavity) is operating in anti-resonance, whereas negative indexes means that the device is operating in resonance.

The exact design of the phase adjustment elements and the Bragg gratings can be calculated and designed by the man skilled in the art from a given desired functionality. E.g. all Fabry-Perot cavities may be operated in resonance by only utilizing negative k (except possibly also k=0) or letting all cavities operate in anti-resonance.

It shall be appreciated that the phase control elements $\phi_{2k}$ may be omitted, in which instance the respective cavity length $L_c(k)$ may be different.

Further, one of the phase adjustments $\phi_{1k}$ and the phase adjustment elements 51, 53, 55, 57 in the respective Michelson arm may be omitted and the remaining phase adjustment element is adjusted thereafter.

In the case one desires to obtain cyclic switching of the different demultiplexed signals the phase control elements 51, 53, 55, 57 are preferably designed as actively controllable elements, whereas the NLPR devices are designed with fixedly adjusted trimming elements, which are preferably written into the waveguides.

Figure 6:
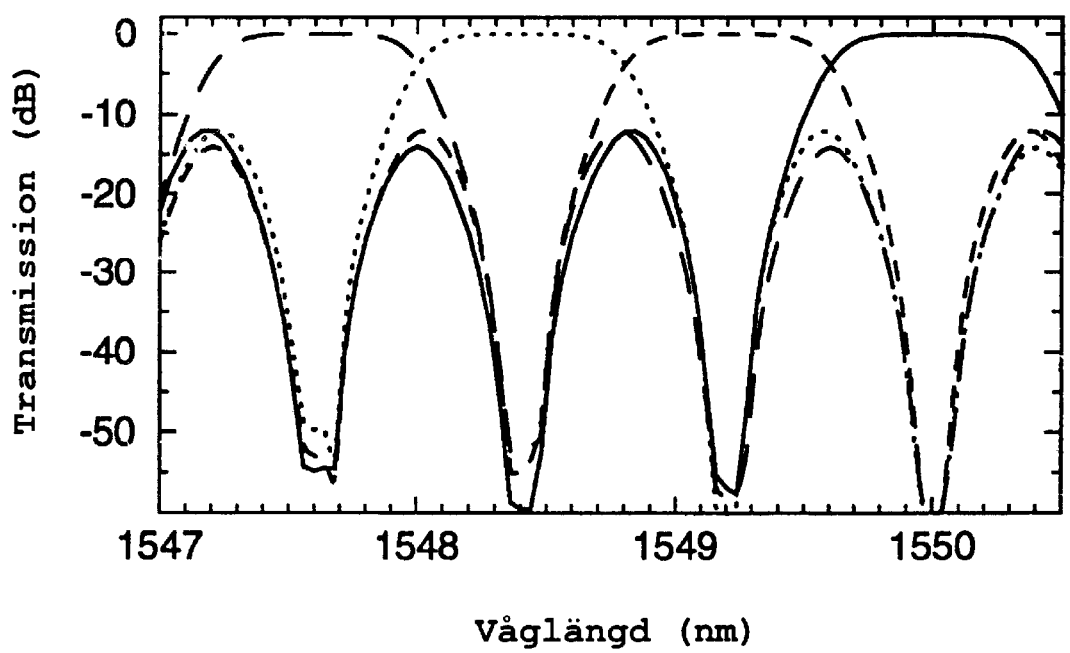
FIG. 6 shows the filter response for the device of FIG. 1 equipped with five NLPR devices of FIG. 5.

In FIG. 6 a simulated filter response for the above (de)multiplexer provided with NLPR devices in the Michelson arms is shown ($\lambda_1$: dashed line, long dashes, $\lambda_2$: dotted line, $\lambda_3$: dashed-dotted line and $\lambda_4$: solid line). As appears from the diagram relatively flat and wide pass bands with a very low crosstalk level over a usable frequency region are attained.

Further, the NLPR devices are considerably more compact and less complex to design than the chirped Bragg gratings, of which one is shown in FIG. 3.

Certainly, an OADM device according to FIG. 4 may utilize the above NLPR devices as reflecting means in MMIMI MUX 61 and MMIMI DEMUX 1, respectively.

The invention as herein described provides for a compact solution, particularly for multiplexing/demultiplexing with a very close wavelength distance, which may give advantages in respect of performance (principally as regards filter profile and cross-talk). The compact structure gives possibilities to reduce the losses and also the power consumption in comparison with conventional MMIMZI structures. Further, a more stable performance is achieved when the light has short propagation paths through the device.

If reflection structures with non-linear phase response are used, a very system-tolerant filter profile may be obtained.

Certainly, the MMIMI demultiplexer 1 and the MMIMI multiplexer 61, respectively, may be scaled to be used for an arbitrary number of wavelength channels. It shall, however, be noted that the demultiplexer described above needs an MMI coupler of size N×N for the handling of i channels, where $$N \geq i+1.$$

It shall, however, be appreciated that it is sufficient with N=i, if the same port may be used for inputting the multiplexed signal and outputting one of the demultiplexed channels.

Further, the demultiplexer does not need to completely demultiplex a signal but it can e.g. be used for demultiplexing an optical signal comprising eight channels to two separated signals, where each signal comprises four channels.

The invention is, of course, not limited to the embodiments described above and shown in the drawings but can be modified within the scope of the appended claims. Particularly, the invention is apparently not limited as regards material choice, dimensions and fabrication of the device.

What is claimed is:

1. A device for demultiplexing a wavelength multiplexed optical signal comprising at least a first and a second optical wavelength channel centered around respective predetermined wavelengths ($\lambda_1$, $\lambda_2$), said device comprising
    an MMI coupler, at least of the size 2×2, for inputting the wavelength multiplexed optical signal at an input and for splitting the multiplexed signal into components and imaging these at several ports,
    Michelson waveguides for receiving and transporting the components imaged at the ports of the MMI coupler,
    reflecting means for reflecting the components received and transported in the Michelson waveguides back to the ports of the MMI coupler, wherein
    the MMI coupler is arranged for inputting the reflected components,
    the respective lengths of the Michelson waveguides are adapted so that said MMI coupler combines the components in such a manner that the first and the second optical wavelength channels are imaged substantially at different outputs of the MMI coupler, and
    the lengths $L_k$ of the respective Michelson waveguides are adapted according to $$L_k = L_0 + (kw/2N)$$

where $L_0$ is a given arbitrarily chosen length, k is an index of the respective waveguide, N is the number of Michelson waveguides in the demultiplexer and $w = \lambda^2/(\Delta\lambda n_g)$, in which expression $\lambda$ is the center wavelength of the incoming wavelength multiplexed optical signal, $\Delta\lambda$ is the wavelength distance between the first and the second optical wavelength channel and $n_g$ is the group refractive index of the Michelson waveguides.

2. The device as claimed in claim 1 wherein it comprises a phase adjustment means for phase adjustment of at least some of the components received and transported in the Michelson waveguides.

3. The device as claimed in claim 2 wherein the phase adjustment means is comprised of a trimming element for permanent fine adjustment of the phase of at least some of the components received and transported in the Michelson waveguides.

4. The device as claimed in claim 2 wherein the phase adjustment means is comprised of a thermo-optical phase control element for phase control of the phase of at least some of the components received and transported in the Michelson waveguides.

5. The device as claimed in claim 1 wherein it comprises electro-optical phase control elements for active phase control of the phases of the components received and transported in the Michelson waveguides to enable selective switching of the wavelength channels at the outputs.

6. The device as claimed in claim 1 wherein the reflecting means are comprised of Bragg gratings.

7. The device as claimed in claim 6 wherein the Bragg gratings are provided with chirp.

8. The device as claimed in claim 7 wherein the Bragg gratings have grating periods $\Lambda = \Lambda(z)$ given by $$\Lambda(z) = \Lambda_1 + c_1 z + c_2 z^2 + c_3 z^3 + \ldots,$$

where $c_1$, $c_2$ and $c_3$ are constants and z is the distance in the direction of propagation of light.

9. The device as claimed in claim 1 wherein at least one of the reflecting means comprises a Fabry-Perot cavity.

10. The device as claimed in claim 9 wherein at least one of the reflecting means comprises a respective Fabry-Perot cavity.

11. The device as claimed in claim 9 wherein each Fabry-Perot cavity comprises a partially reflecting Bragg grating and a total reflecting structure interconnected by a waveguide.

12. The device as claimed in claim 11 wherein each Fabry-Perot cavity is provided with a first respective phase adjustment means arranged between the respective Bragg grating and the respective total reflection structure.

13. The device as claimed in claim 12 wherein each Fabry-Perot cavity is provided with a respective phase adjustment means arranged between the respective Michelson waveguide and respective Bragg grating of said Fabry-Perot cavity.

14. The device as claimed in claim 12 wherein each of the phase adjustment means of each Fabry-Perot cavity is comprised of a trimming element for permanent fine adjustment of the phase of the components input and transported in the Michelson waveguides.

15. A device for optical add/drop multiplexing, said device comprising the device for demultiplexing according to claim 1.

16. The device as claimed in claim 15 comprising an input waveguide for inputting an optical multiplexed signal to the demultiplexer, at least one transit waveguide for outputting a demultiplexed channel from the demultiplexer and for transferring and inputting the same at a multiplexer, at least one waveguide for outputting a further demultiplexed channel from the demultiplexer for dropping, at least one waveguide for inputting a further channel to the multiplexer, and an output waveguide for outputting an optical multiplexed signal comprising the demultiplexed channel transmitted in the transit waveguide and the further signal input to the multiplexer.

17. The device as claimed in claim 15 wherein the demultiplexer and the multiplexer are provided with active phase control elements, whereby the device exhibits wavelength selective tunability.

* * * * *